United States Patent
Potnis et al.

(10) Patent No.: US 11,334,441 B2
(45) Date of Patent: May 17, 2022

(54) DISTRIBUTION OF SNAPS FOR LOAD BALANCING DATA NODE CLUSTERS

(71) Applicant: EMC IP HOLDING COMPANY LLC, Hopkinton, MA (US)

(72) Inventors: Ajay Potnis, Pune (IN); Amit Dharmadhikari, Pune (IN)

(73) Assignee: Dell Products L.P., Hopkinton, MA (US)

( * ) Notice: Subject to any disclaimer, the term of this patent is extended or adjusted under 35 U.S.C. 154(b) by 273 days.

(21) Appl. No.: 16/427,402

(22) Filed: May 31, 2019

(65) Prior Publication Data

US 2020/0379849 A1 Dec. 3, 2020

(51) Int. Cl.
| | |
|---|---|
| *G06F 11/00* | (2006.01) |
| *G06F 11/14* | (2006.01) |
| *G06F 16/11* | (2019.01) |
| *H04L 67/1036* | (2022.01) |
| *H04L 67/1097* | (2022.01) |
| *H04L 41/5006* | (2022.01) |
| *G06F 16/182* | (2019.01) |

(52) U.S. Cl.
CPC ...... *G06F 11/1464* (2013.01); *G06F 11/1484* (2013.01); *G06F 16/128* (2019.01); *G06F 16/1827* (2019.01); *H04L 41/5006* (2013.01); *H04L 67/1036* (2013.01); *H04L 67/1097* (2013.01); *G06F 2201/84* (2013.01)

(58) Field of Classification Search
CPC .............. G06F 11/1484; G06F 16/128; G06F 2201/84; G06F 3/065; G06F 2009/45579; H04L 67/1036; H04L 67/1097
USPC .......................................................... 714/15
See application file for complete search history.

(56) References Cited

U.S. PATENT DOCUMENTS

| | | | | |
|---|---|---|---|---|
| 2002/0156984 A1* | 10/2002 | Padovano | ........... | H04L 67/1097 711/148 |
| 2005/0223096 A1* | 10/2005 | Shinkai | ................. | H04L 61/103 709/225 |
| 2009/0240975 A1* | 9/2009 | Shitomi | .................. | G06F 3/067 714/5.11 |
| 2009/0287887 A1* | 11/2009 | Matsuki | .................. | G06F 3/061 711/154 |
| 2010/0023717 A1* | 1/2010 | Jinno | ...................... | G06F 3/067 711/162 |
| 2011/0167234 A1* | 7/2011 | Nishibori | ............ | G06F 11/1456 711/162 |
| 2013/0212345 A1* | 8/2013 | Nakajima | ............. | G06F 3/0605 711/161 |

(Continued)

*Primary Examiner* — Umar Cheema
*Assistant Examiner* — Tesfu N Mekonen
(74) *Attorney, Agent, or Firm* — Anderson Gorecki LLP (57) ABSTRACT

Snaps are distributed among data nodes for load balancing and overload avoidance. A snap is initially associated with a first VNAS server on a first data node that hosts the primary volume being snapped. A second data node is selected based on loading. The second data node may be in the same or a different cluster. A second VNAS server is instantiated on the second data node. The snap is then mounted on the second VNAS server. The second VNAS server may be configured as the target for all reads to the snap. If the second data node is in a different cluster than the snap may be copied or moved from a first SAN node to a second SAN node. Multiple copies of snaps may be distributed, and individual snaps and copies may be associated with different SLOs.

18 Claims, 4 Drawing Sheets

(56) References Cited

U.S. PATENT DOCUMENTS

| | | | |
|---|---|---|---|
| 2013/0311616 A1* | 11/2013 | Wang | G06F 3/061 709/219 |
| 2015/0143064 A1* | 5/2015 | Bhargava | G06F 11/1451 711/162 |

* cited by examiner

DISTRIBUTION OF SNAPS FOR LOAD BALANCING DATA NODE CLUSTERS

TECHNICAL FIELD

The subject matter of this disclosure is generally related to load balancing for clusters of data nodes providing network-attached storage.

BACKGROUND

NAS (network-attached storage) can be used to provide multiple client computers with file-level access to data via a network. A NAS server typically includes local storage drives arranged in a RAID (redundant array on independent disks). File sharing protocols such as NFS (network file system), SMB (server message block), and AFP (apple filing protocol) can be used by client computers to access files from the NAS server. The files that are stored by the NAS server can be presented in a folder or other standard OS (operating system) feature on each client computer.

A SAN (storage area network) provides multiple host computers with block-level access to data via a network. The SAN includes a network of computers that manage access to multiple arrays of drives that may be arranged in RAID groups. SANs create logical volumes of storage that are presented to host computers that run host applications, e.g. block servers and email servers, that may be used by client computers. Each logical volume has a volume ID and contiguous logical address space. The host computers send block-level IO (input-output) commands to the SAN to access the logical volumes. Because they are block-based, SANs are unaware of higher-level data structures such as files. SANs have advantages over NAS in terms of potential storage capacity and scalability, but file-based access may be preferred by some organizations based on ease of use.

A cluster of data nodes combines the advantages of SAN storage capacity and scalability with the ease of use of NAS file-based access. A data node maintains filesystems for logical volumes and provides file-level access to clients while using a block-based SAN for data storage. From the perspective of the client computers the data node appears to be a standard NAS server. For example, files may be presented in a folder on each client computer and accessed using standard file-level storage protocols. However, the data node uses block-level commands to access the storage resources of the SAN on which the data is stored. The data node may support protocols such as iSCSI (internet small computer system interface) that are not typically supported by NAS servers but are more commonly supported by SANs.

SUMMARY

All examples, aspects and features mentioned in this document can be combined in any technically viable way.

An apparatus in accordance with some aspects comprises: a first data node; a second data node; a first SAN (storage area network) node that maintains a primary volume associated with a filesystem maintained by a first VNAS (virtual NAS) server hosted by the first data node; and program code in non-transitory memory comprising: snap creation instructions that prompt creation of a snap on the first SAN node; instantiation instructions that prompt instantiation of a second VNAS server hosted by the first data node; instructions that create a first snap device on the second VNAS server; copying instructions that copy the filesystem from the first VNAS server to the second VNAS server; selection instructions that select a second data node based on load balancing; instructions that instantiate a third VNAS server hosted by the second data node; instructions that mount the snap on the third VNAS server; and instructions that prompt servicing all reads to the snap with the third VNAS server. In some implementations the selection instructions balance loading of data nodes including the first data node within a first cluster. In some implementations the selection instructions balance loading of data nodes including the first data node within a plurality of clusters comprising a first cluster and a second cluster. In some implementations the first data node is in the first cluster and the second data node is in the second cluster and instructions copy or move the snap to a second SAN node that is in communication with the second data node. Some implementations comprise instructions that create a second snap device on the third VNAS server. Some implementations comprise instructions that copy the filesystem from the second VNAS server to the third VNAS server. Some implementations comprise instructions that configure the third VNAS server as a target for all reads to the snap. In some implementations the snap is stored on a primary storage group of the first SAN node and instructions create a copy of the snap outside the primary storage group. In some implementations the instructions that create the copy of the snap outside the primary storage group create a copy of the snap on a backup storage group. Some implementations comprise instructions that implement a first SLO (service level obligation) for access to the copy of the snap on the primary storage group and implement a second SLO for access to the copy of the snap on the backup storage group, where the first SLO is different than the second SLO.

A method in accordance with some aspects comprises: in a storage network comprising a first data node and a second data node in communication with a first SAN (storage area network) node that maintains a primary volume associated with a filesystem maintained by a first VNAS (virtual NAS) server hosted by the first data node: creating a snap on the first SAN node; instantiating a second VNAS server hosted by the first data node; creating a first snap device on the second VNAS server; copying the filesystem from the first VNAS server to the second VNAS server; selecting a second data node based on load balancing; instantiating a third VNAS server hosted by the second data node; mounting the snap on the third VNAS server; and servicing all reads to the snap with the third VNAS server. In some implementations selecting the second data node based on load balancing comprises balancing loading of data nodes including the first data node within a first cluster. In some implementations selecting the second data node based on load balancing comprises balancing loading of data nodes including the first data node within a plurality of clusters comprising a first cluster and a second cluster. In some implementations, wherein the first data node is in the first cluster and the second data node is in the second cluster, the method comprises copying or moving the snap to a second SAN node that is in communication with the second data node. Some implementations comprise creating a second snap device on the third VNAS server. Some implementations comprise copying the filesystem from the second VNAS server to the third VNAS server. Some implementations comprise configuring the third VNAS server as a target for all reads to the snap. In some implementations, wherein the snap is stored on a primary storage group of the first SAN node, the method comprises creating a copy of the snap outside the primary storage group. In some implementations creating the copy of the snap outside the primary storage group comprises creating a copy of the snap on a backup storage group. Some implementations comprise implementing a first SLO (service level obligation) for access to the copy of the snap on the primary storage group and implementing a second SLO for access to the copy of the snap on the backup storage group, where the first SLO is different than the second SLO.

Various other aspects, features, and implementations will be apparent in view of the detailed description and figures.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible non-transitory features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
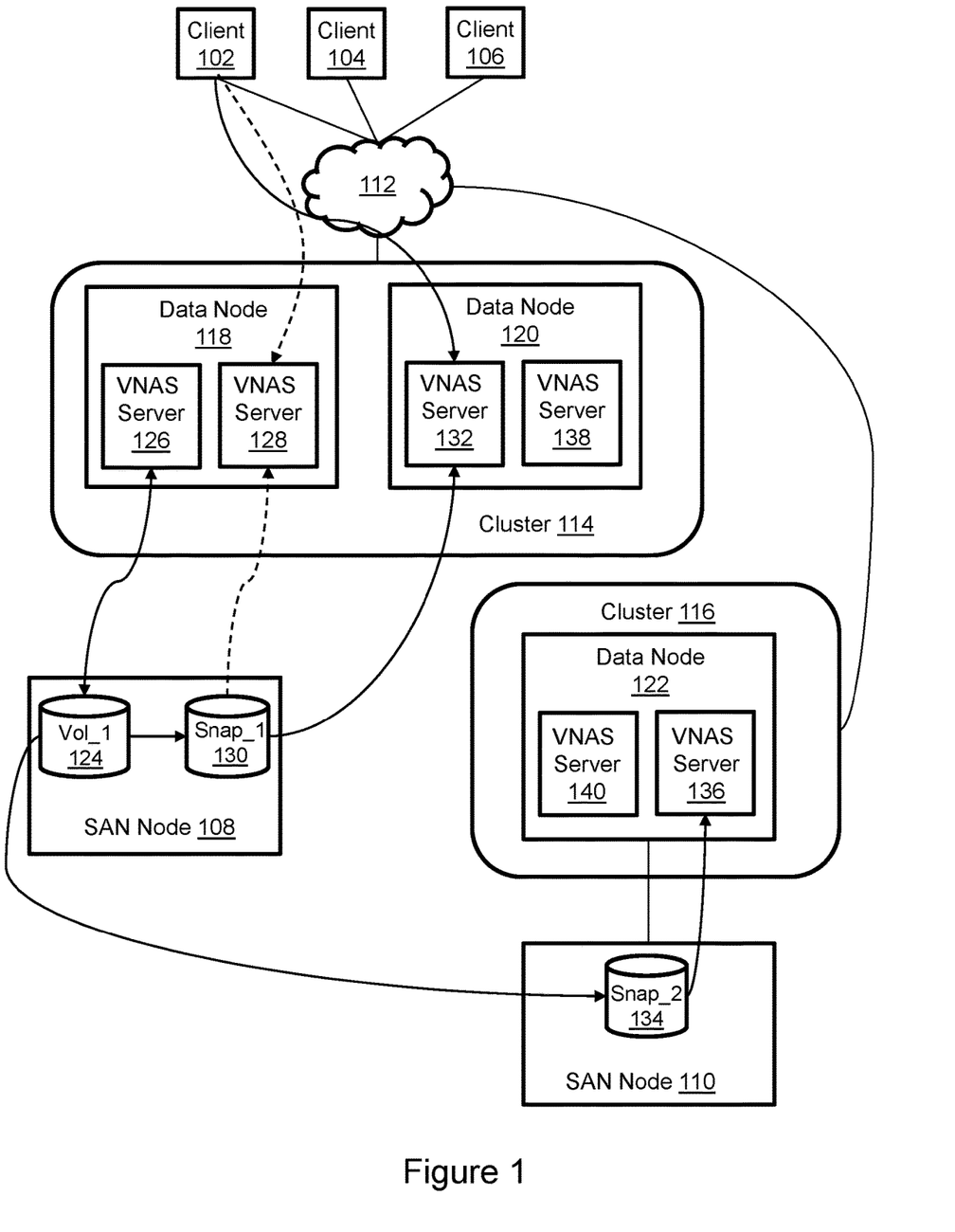
FIG. 1 illustrates distribution of snaps for load balancing within and among data node clusters.

FIG. 1 illustrates load balancing of data nodes by distributing snaps within and among clusters. Client computers 102, 104, 106 are connected to data node clusters 114, 116 via a network 112. Cluster 114 includes data node 118 and data node 120. Cluster 116 includes data node 122. Cluster 114 is connected to SAN node 108. Cluster 116 is connected to SAN node 110. The number of computing elements has been simplified in the illustrated example for purposes of explanation and to accommodate the practical limitations of illustration on a single sheet of drawing.

The client computers 102, 104, 106 have access to files on a logical volume 124 (Vol_1) that is maintained by SAN node 108. The client computers can read and write data from and to the logical volume by sending file-level protocol commands to data node 118, thereby prompting data node 118 to communicate with SAN node 108 at the block level. data node 118 may instantiate multiple VNAS (virtual NAS) servers 126, 128. Each VNAS server is uniquely associated with, and maintains a filesystem for, one logical volume. In the illustrated example VNAS server 126 maintains a filesystem FS_1 for logical volume 124 (Vol_1). Therefore, all client access to logical volume 124 (Vol_1) is through VNAS server 126.

It is known to generate incremental backups of logical volumes to avoid permanent data loss and enable recreation of the state of a data set at a prior point-in-time. Full backups typically require considerable time and resources to generate so incremental backup volumes known as snapshots or simply "snaps" may be created. Each snap includes only the changes that have occurred to the associated data of the snapped volume since the most recent snap. Snaps may be used for a variety of purposes including but not limited to data recovery.

In the illustrated example data node 118 prompts the SAN node 108 to create each snap of the logical volume 124 (vol_1). To generate a snap of a logical volume that is accessed via a data node a new VNAS server is instantiated on the same data node as the VNAS server that maintains the filesystem for the logical volume being snapped. A filesystem for the snap is then created on, or copied to, the newly instantiated VNAS server. In the illustrated example VNAS server 128 is instantiated on data node 118 for creation of a first snap 130 (snap_1) of logical volume 124 (Vol_1). The filesystem FS_1 is then copied from VNAS server 126 to VNAS server 128. The client computers 102, 104, 106 can continue to access the logical volume 124 (Vol_1) via VNAS server 126 and can also access the snap 130 (snap_1) via VNAS server 128. Additional VNAS servers may be instantiated on data node 118 for each subsequently generated snap (snap_2, snap_3, snap_4 etc.) of the logical volume 124 (Vol_1). However, accumulation of snaps and associated reads to those snaps can create imbalanced loading or overloading of data node 118 on which the snaps would normally be maintained. This can result in poor read/write access to logical volume 124 (Vol_1).

Load balancing or overload avoidance may be achieved by distributing some or all generated snaps from data node 118 to other data nodes. For example, snap_1 may be copied or moved from VNAS server 128 on data node 118 to VNAS server 132 on data node 120. Subsequently generated snaps may be distributed among other data nodes (not illustrated) in cluster 114. There would typically be more than two data nodes in the cluster 114. Alternatively, or additionally, subsequently generated snaps, e.g. snap 134 (snap_2), may be copied or moved to VNAS server 136 on data node 122 which is in a different cluster 116 than data node 118, which is in cluster 114. VNAS server 138 and VNAS server 140 may be instantiated for subsequently generated snaps of vol_1, e.g. snap_3 and snap_4. Thus, IO loading associated with reads to snaps may be distributed to balance overall IO loading among data nodes within a single cluster or among data nodes of multiple clusters.

Figure 2:
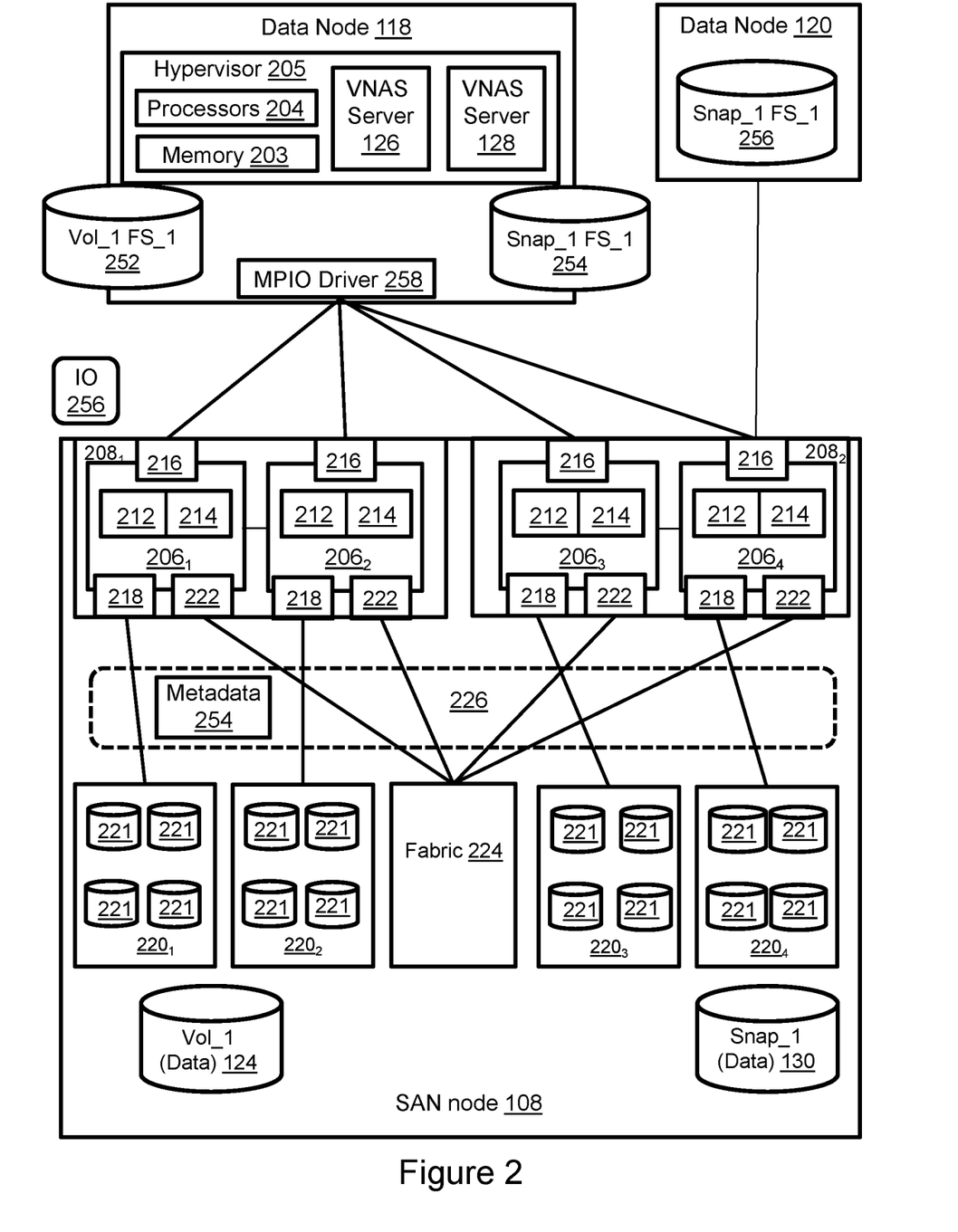
FIG. 2 illustrates a data node and SAN node in greater detail.

FIG. 2 illustrates data node 118 and SAN node 108 in greater detail. The data node 118 may be a server computer or NAS gateway with volatile memory 203, tangible processors 204, and a hypervisor 205. The hypervisor manages allocation of the memory 203 and processors 204 to virtual machines or containers in which instantiated VNAS servers such as VNAS server 126 and VNAS server 128 run. The SAN node 108 is a storage array that includes a plurality of computing nodes $206_1$-$206_4$. Pairs of the computing nodes, e.g. ($206_1$, $206_2$) and ($206_3$, $206_4$), may be organized as storage engines $208_1$, $208_2$, respectively, for purposes of failover between computing nodes. The paired computing nodes of each storage engine may be directly interconnected by communication links. Each computing node includes at least one tangible multi-core processor 212 and a local volatile memory 214. The local volatile memory 214 may include, for example and without limitation, components such as RAM (random access memory) of any type. Each computing node may include one or more FAs 216 (front-end adapters) for communicating with the data node 118. Each computing node $206_1$-$206_4$ may also include one or more BAs 218 (back-end adapters) for communicating with respective associated back-end storage bays $220_1$-$220_4$, thereby enabling access to managed drives 221. The managed drives 221 may include tangible persistent storage components of one or more technology types, for example and without limitation SSDs (Solid State Drives) such as flash, and HDDs (hard disk drives) such as SATA (Serial Advanced Technology Attachment) and FC (Fibre Channel). Each computing node may also include one or more CAs (channel adapters) 222 for communicating with other computing nodes via an interconnecting fabric 224. Each computing node may allocate a portion or partition of its respective local volatile memory 214 to a virtual shared memory 226 that can be accessed by other computing nodes, e.g. via DMA (direct memory access) or RDMA (remote direct memory access).

The SAN node 108 maintains client data for the VNAS servers 126, 128 that run on the data node 118. VNAS server instances may write data to the SAN node and read data from the SAN node to perform various functions. The primary logical volume 124 (Vol_1) is created to enable the SAN node 108 to provide storage services to VNAS server 126. The logical volume 124 (Vol_1) may be referred to as a TLU (thinly-provisioned logical unit) or LUN (Logical Unit Number), where LUN is used interchangeably to refer to the logical volume and an identification number used to designate the logical volume in accordance with the SCSI (Small Computer System Interface) protocol. A corresponding logical device 252 is a data node-local representation of the logical volume 124 (Vol_1) including the associated filesystem FS_1. The logical volume 124 (Vol_1) is an abstraction layer between the managed drives 221 and the VNAS server instances. From the perspective of the data node, the logical volume 124 (Vol_1) is a single data storage device having a set of contiguous fixed-size LBAs (logical block addresses) on which data resides. However, the data is maintained by the computing nodes $206_1$-$206_4$ at non-contiguous addresses on various managed drives 221 and the managed drives are not discoverable by the data node.

To service IOs from the clients via the VNAS servers the SAN node 108 maintains metadata 254 that indicates, among various things, mappings between logical volume 124 (Vol_1) storage space and the locations of extents of data on the managed drives 221. The clients send file-level storage commands to the VNAS servers and the VNAS servers generate corresponding block-level storage commands. For example, VNAS server 126 may generate an IO 256 with reference to LBAs of the logical volume 124 (Vol_1) to access LBAs associated with FS_1. An MPIO (Multi-Path Input-Output) driver 258 selects a path on which to send the IO 256 to the SAN node 108. There are multiple paths between the data node and the SAN node, e.g. one path per FA 216. Each path may have a locally unique address that is known to the MPIO driver 258. However, the VNAS servers are not aware of the paths and addresses because they view the logical volume 124 (Vol_1) as being available via a single logical path. The paths may be selected by the MPIO driver based on a wide variety of techniques and algorithms including, for context and without limitation, performance and load balancing. In the case of a read IO the SAN node uses the metadata 254 to locate the data/address space specified by IO 256, e.g. in the shared memory 226 or managed drives 221. If the data is not in the shared memory, then it is temporarily copied into the shared memory from the managed drives and sent to the data node via one of the computing nodes. In the case of a write IO the SAN node marks the data as dirty and creates new metadata that maps the logical volume address with a location to which the data is written on the managed drives. The shared memory 226 may enable the logical volume to be reachable via all the computing nodes and paths, although the SAN node can be configured to limit use of certain paths to certain volumes.

The SAN node 108 can generate block-level snaps such as snap 130 (snap_1) from logical volume 124 (vol_1) in the managed drives 221 in response to commands from the data node 118. However, for the data of a snap such as snap_1 to be accessible to the client computers at the file level it is necessary to generate a corresponding device with a filesystem on the data node 118, e.g. device 254 for snap 130 (snap_1) with filesystem FS_1. Further, a new VNAS server 128 must be instantiated to host that device 254. As mentioned above, each logical volume is uniquely associated with one VNAS server. The device and filesystem may then be distributed away from data node 118 to accomplish load balancing or overload avoidance. For example, snap_1 may be mounted on data node 120 using a snap_1 FS_1 device 256.

Figure 3:
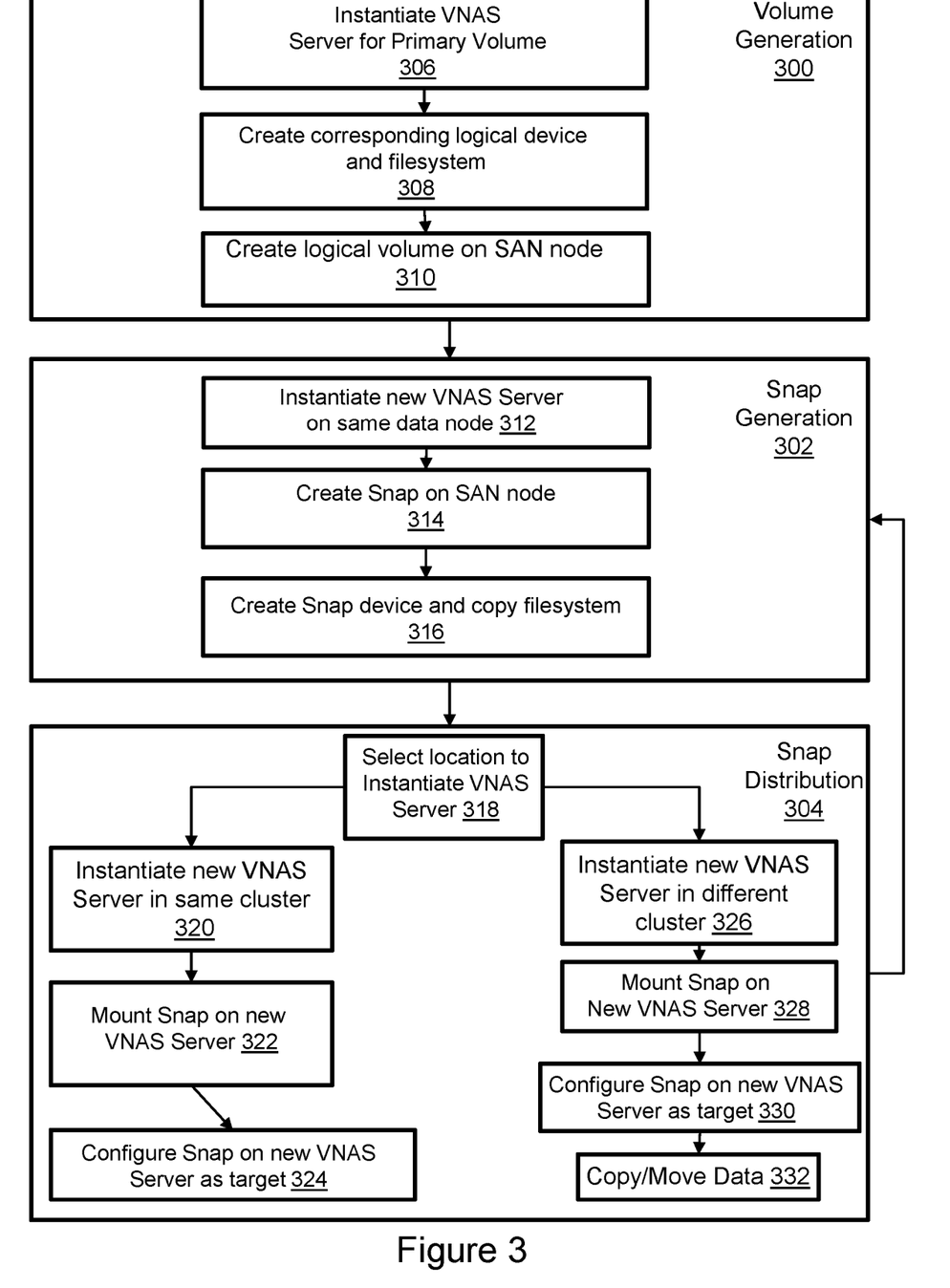
FIG. 3 illustrates a process for creating and distributing snaps.

FIG. 3 illustrates a process for creating snaps and then distributing those snaps to other data nodes for load balancing. The process includes a volume generation stage 300, a snap generation stage 302, and a snap distribution stage 304. The snap generation and snap distribution stages are iterated for each new snap.

The first step 306 in volume generation 300 is to instantiate a VNAS server for a primary volume, e.g. instantiate VNAS server_1 on a data node_1. A corresponding logical device with a filesystem is created on the VNAS server in step 308, e.g. device vol_1 with filesystem FS_1. The instantiated VNAS server hosts the device. A corresponding logical volume is created on the SAN node in step 310, e.g. logical volume Vol_1 is created on SAN_1. Client computers may then be provided with read/write access to the primary volume via the VNAS server.

To create a snap of the primary volume in the snap generation stage 302, a new VNAS server is instantiated on the data node in step 312, e.g. VNAS server_2 is instantiated on data node_1. A snap is created on the SAN node in step 314, e.g. create Snap 1. A corresponding snap device is created on the new VNAS server in step 316, e.g. device snap_1 on VNAS server_2. Step 316 includes copying the filesystem from the primary volume device to the snap device, e.g. copying FS_1 from vol_1 to snap_1. The snap (Snap_1) is then mounted on the new VNAS server (VNAS server_2) and accessible to client computers, but because the snap device resides on the same data node as the snapped volume the same data node would service read/write access to the primary volume and read access to the snap.

The first step 318 of snap distribution 304 is to select a location to instantiate another new VNAS server to host the snap, e.g. VNAS server_2. A variety of factors may be used for selection, including but not limited to load balancing among a group of data nodes. The location is a different data node than the data node that hosts the primary volume device, e.g. data node_2. The different data node may be in the same cluster as, or a different cluster than, the data node that hosts the snapped volume device. Step 320 represents the case in which the selected location is in the same cluster, e.g. VNAS server_2 is instantiated on data node_2 in the same cluster as data node_1. Both data node_1 and data node_2 have access to the same SAN node, i.e. SAN Node_1. The snap volume is mounted on the VNAS server to which the snap is being distributed in step 322, e.g. Snap_1 is mounted on VNAS server_2. A VNAS server hosted device corresponding to the mounted volume is created in step 322. The filesystem is copied to the new VNAS server in step 322, e.g. FS_1 is copied from VNAS server_1 to VNAS server_2 and associated with the hosted device. VNAS server_2 is then configured as the target for reads to the snap volume, Snap_1, in step 324.

Step 326 represents the case in which a new VNAS server is instantiated on a data node in a different cluster, e.g. VNAS server_3 instantiated on data node_3, where data node_3 does not have access to SAN node_1. For example, VNAS server_3 may be instantiated for a snap of Vol_1 generated after Snap_1, e.g. Snap_2. The new snap volume is mounted on the VNAS server to which the snap is being distributed in step 328, e.g. Snap_2 is mounted on VNAS server_3. A VNAS server hosted device corresponding to the mounted volume is created in step 328. VNAS server_3 is configured as the target for reads to the snap volume, snap_2, in step 330. The snap data is copied or moved to the SAN node to which the new VNAS server has access in step 332, e.g. snap data copied or moved from SAN node_1 to SAN node_2. This may be accomplished by prompting SAN node_1 to send data to SAN node_2. In some implementations the data is copied to VNAS server_1 and sent from VNAS server_1 to VNAS server_3, e.g. using an IP network or an NDMP (network data management protocol) server. Further, the corresponding filesystem is copied in step 332, e.g. FS_1 is copied from VNAS server_1 to VNAS server_3 and associated with the hosted device.

Figure 4:
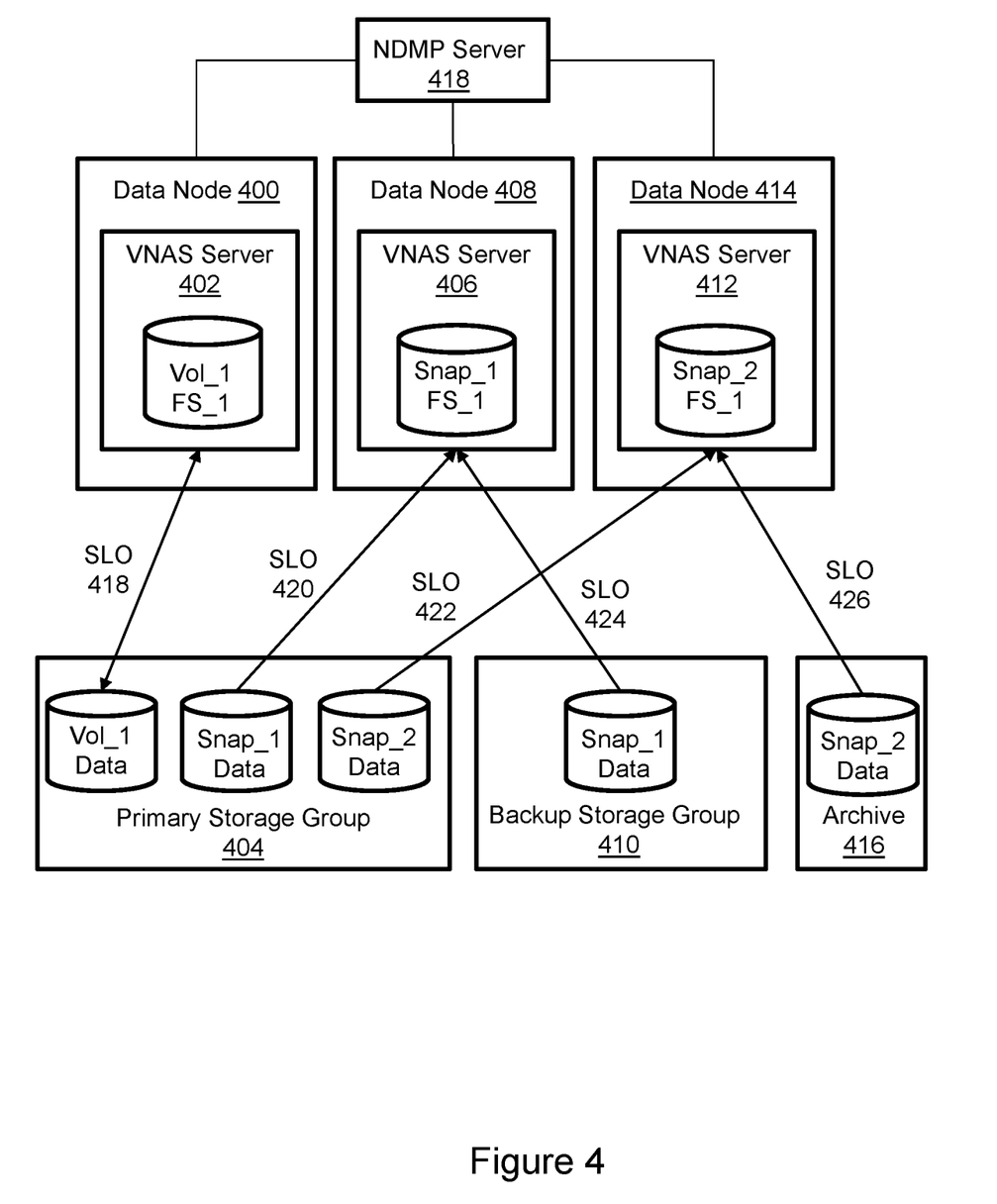
FIG. 4 illustrates assignment of different SLOs to different distributed snaps.

FIG. 4 illustrates assignment of different SLOs to different distributed snaps. In the illustrated example data node 400 hosts a VNAS server 402 that maintains a device and filesystem (vol_1, FS_1) for a primary volume (Vol_1). The primary volume data is maintained on a primary storage group 404 of a SAN node. A first snap, snap_1, of the primary volume has been distributed to VNAS server 406 which is hosted by data node 408. Copies of the snap_1 data are maintained by both the primary storage group 404 and a backup storage group 410. A second snap, snap_2, of the primary volume has been distributed to VNAS server 412 which is hosted by data node 414. Copies of the snap_2 data are maintained by both the primary storage group 404 and an archive 416. An NDMP server 418 functions to move data between the data nodes. The primary storage group 404 may include relatively high-performance storage resources, e.g. SSDs such as flash. The archive 416 may include low performing storage resources such as tape backup. The backup storage group 410 may include storage resources, e.g. HDDs, that are higher performing than archive but not as high performing as the primary storage group. The primary volume (Vol_1) and each copy of each snap may have a separate and distinct SLO (service level obligation) or other designated performance level in terms that may include read/write latency and IOPS (input-output operations per second). For example, an SLO may govern read/write access to Vol_1 and SLOs 420, 422 may govern read access to Snap_1 and Snap_2 copies in the primary storage group. SLO 424 governs access to the copy of Snap_1 in the backup storage group and SLO 426 governs access to the copy of Snap_2 in archive. The hypervisors of the data nodes may allocate resources to VNAS servers based on the SLOs. For example, a VNAS server supporting lower performance SLOs may be allocated fewer resources than a VNAS server supporting higher performance SLOs.

Specific examples have been presented for context and to help convey inventive concepts. The specific examples are not to be considered as limiting the invention. A wide variety of modifications may be made without departing from the scope of the inventive concepts described herein. Moreover, the features, aspects, and implementations described herein may be combined in any technically conceivable way. Accordingly, modifications and combinations are within the scope of the following claims.

What is claimed is:

1. An apparatus comprising:
a first data node;
a second data node;
a first storage area network (SAN) node that maintains client data on a primary volume associated with a filesystem maintained by a first virtual network attached storage (VNAS) server hosted by the first data node; and
program code in non-transitory memory comprising:
snap creation instructions that prompt creation of a snap of the primary volume on a snap volume on the first SAN node;
instantiation instructions that prompt instantiation of a second VNAS server hosted by the first data node;
instructions that mount the snap volume on the first SAN node on the second VNAS server;
copying instructions that copy the filesystem from the first VNAS server to the second VNAS server;
selection instructions that select the second data node based on load balancing, including loading associated with reads to the snap volume mounted on the second VNAS server;
instructions that instantiate a third VNAS server hosted by the second data node;
instructions that mount the snap volume on the third VNAS server;
instructions that unmount the snap volume from the second VNAS server, thereby prompting servicing all reads to the snap volume mounted on the third VNAS server, whereby snapped client data remains on the snap volume on the first SAN node and loading of the first data node associated with reads to the snap is moved from the first data node to the second data node;
wherein the snap volume is stored on a primary storage group of the first SAN node and comprising instructions that create a copy of the snap volume on a backup storage group and implement a first SLO (service level obligation) for access to the snap volume on a primary storage group and implement a second SLO for access to the copy of the snap volume on the backup storage group, where the first SLO is different than the second SLO.

2. The apparatus of claim 1 wherein the selection instructions balance loading of data nodes including the first data node within a first cluster.

3. The apparatus of claim 1 wherein the selection instructions balance loading of data nodes including the first data node within a plurality of clusters comprising a first cluster and a second cluster.

4. The apparatus of claim 3 wherein the first data node is in the first cluster and the second data node is in the second cluster and comprising instructions that copy or move the snap volume to a second SAN node that is in communication with the second data node.

5. The apparatus of claim 1 comprising instructions that create a snap device on the third VNAS server.

6. The apparatus of claim 1 comprising instructions that copy the filesystem from the second VNAS server to the third VNAS server.

7. The apparatus of claim 1 comprising instructions that configure the third VNAS server as a target for all reads to the snap.

8. The apparatus of claim 1 wherein the snap volume is stored on a primary storage group of the first SAN node and comprising instructions that create a copy of the snap volume outside the primary storage group.

9. The apparatus of claim 8 wherein the instructions that create the copy of the snap volume outside the primary storage group create a copy of the snap volume on a backup storage group.

10. A method comprising:
in a storage network comprising a first data node and a second data node in communication with a first storage area network (SAN) node that maintains client data on a primary volume associated with a filesystem maintained by a first virtual network attached storage (VNAS) server hosted by the first data node:
creating a snap of the primary volume on a snap volume on the first SAN node;
instantiating a second VNAS server hosted by the first data node;
mounting the snap volume on the second VNAS server;
copying the filesystem from the first VNAS server to the second VNAS server;
selecting the second data node based on load balancing, including loading associated with reads to the snap volume mounted on the second VNAS server;
instantiating a third VNAS server hosted by the second data node;
mounting the snap volume of the first SAN node on the third VNAS server;
unmounting the snap volume from the second VNAS server and servicing all reads to the snap volume with the third VNAS server;
wherein the snap is stored on a primary storage group of the first SAN node and comprising creating a copy of the snap volume on a backup storage group and implementing a first SLO (service level obligation) for access to the snap volume on the primary storage group and implementing a second SLO for access to the copy of the snap volume on the backup storage group, where the first SLO is different than the second SLO.

11. The method of claim 10 wherein selecting the second data node based on load balancing comprises balancing loading of data nodes including the first data node within a first cluster.

12. The method of claim 10 wherein selecting the second data node based on load balancing comprises balancing loading of data nodes including the first data node within a plurality of clusters comprising a first cluster and a second cluster.

13. The method of claim 12, wherein the first data node is in the first cluster and the second data node is in the second cluster, comprising copying or moving the snap volume to a second SAN node that is in communication with the second data node.

14. The method of claim 10 comprising creating a snap device on the third VNAS server.

15. The method of claim 10 comprising copying the filesystem from the second VNAS server to the third VNAS server.

16. The method of claim 10 comprising configuring the third VNAS server as a target for all reads to the snap volume.

17. The method of claim 10 wherein the snap is stored on a primary storage group of the first SAN node and comprising creating a copy of the snap volume outside the primary storage group.

18. The method of claim 17 wherein creating the copy of the snap volume outside the primary storage group comprises creating a copy of the snap volume on a backup storage group.

* * * * *